Aug. 16, 1932. W. A. CHRYST 1,871,954

SHOCK ABSORBER

Filed Sept. 28, 1928 2 Sheets-Sheet 1

Inventor
William A. Chryst
By Spencer, Hardman and Fehr
His Attorneys

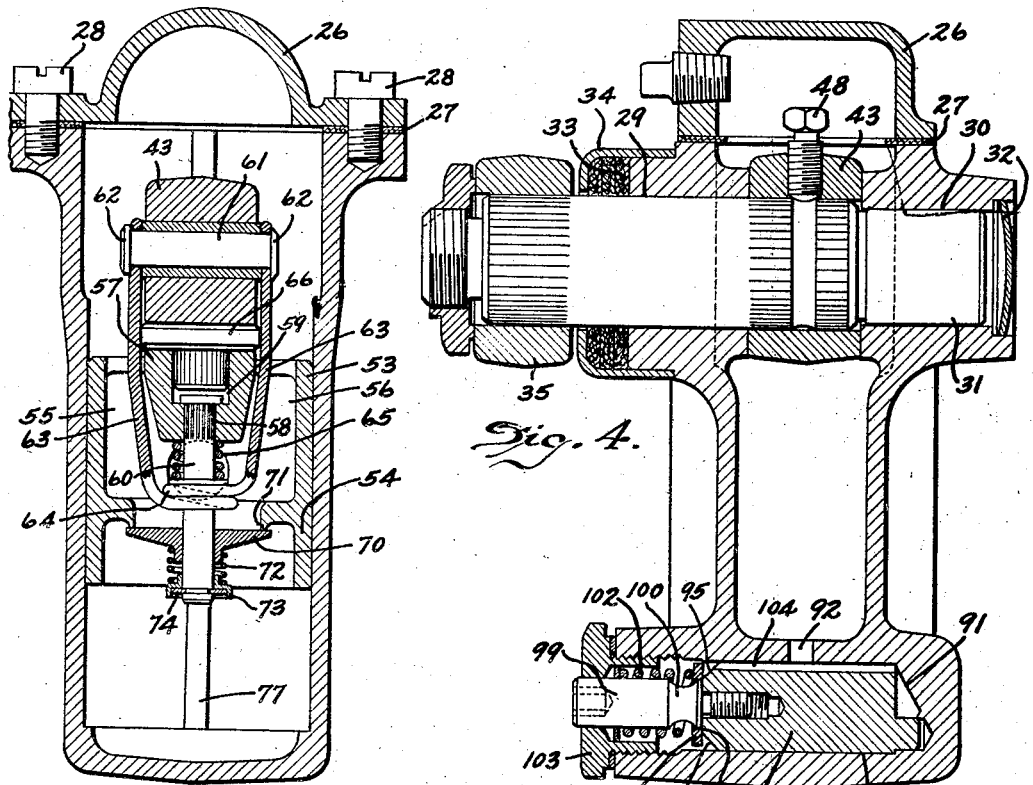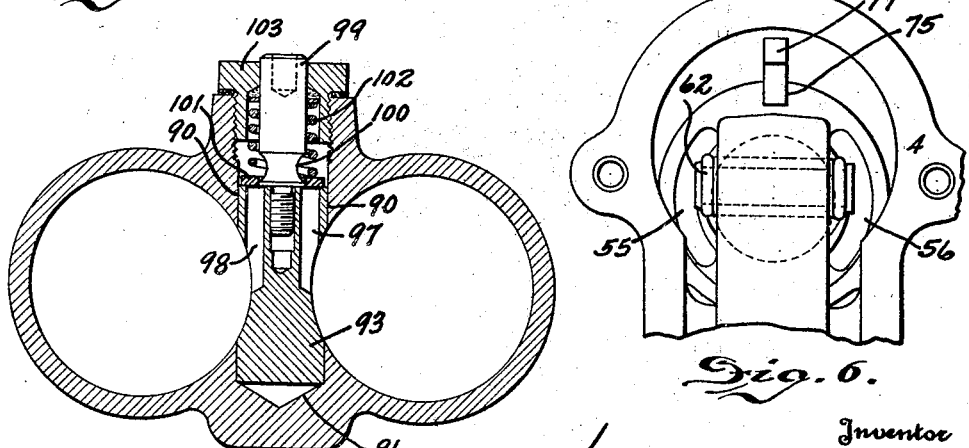

Patented Aug. 16, 1932

1,871,954

UNITED STATES PATENT OFFICE

WILLIAM A. CHRYST, OF DAYTON, OHIO, ASSIGNOR, BY MESNE ASSIGNMENTS, TO DELCO PRODUCTS CORPORATION, OF DAYTON, OHIO, A CORPORATION OF DELAWARE

SHOCK ABSORBER

Application filed September 28, 1928. Serial No. 309,019.

This invention relates to improvements in shock absorbers particularly adaptable for use on automotive or other vehicles.

It is among the objects of the present invention to provide a shock absorber adapted to afford graduated resistances to the forces which tend to cause the axle and frame of the vehicle to approach or separate when such vehicle has struck an obstruction in the roadway upon which it is being operated.

Another object of the invention is to provide a shock absorber of simple structure and design, reliable in its operation, and which may readily be assembled to meet the requirement of the particular vehicle to which it is to be attached.

Further objects and advantages of the present invention will be apparent from the following description, reference being had to the accompanying drawings wherein a preferred embodiment of one form of the present invention is clearly shown.

In the drawings:

Fig. 3 is a sectional view taken along the line 3—3 of Fig. 2.

Fig. 4 is a sectional view taken along the line 4—4 of Fig. 2, certain parts being shown in elevation for the sake of clearness.

Fig. 5 is a sectional view taken along the line 5—5 of Fig. 2.

Fig. 6 is a fragmentary detail view taken in the direction of the arrow 6 in Fig. 2.

Figures 1, 2:
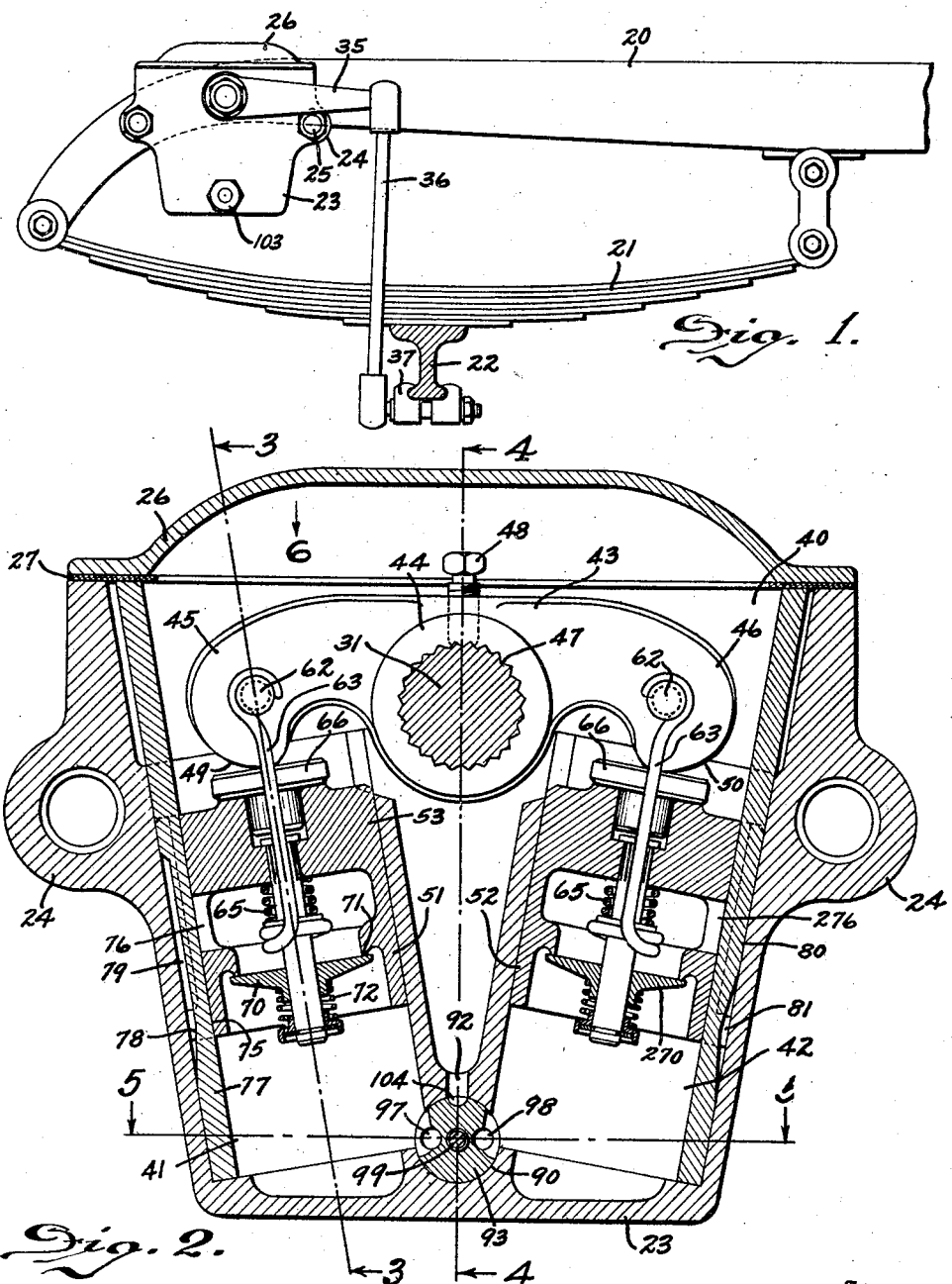
Fig. 1 illustrates a front portion of the frame of an automotive vehicle supported by springs upon the usual axle, the shock absorber embodying the present invention being shown applied thereto.
Fig. 2 is a cross-sectional view taken longitudinally through the shock absorber. Certain parts are shown in elevation for the sake of clearness.

Referring to the drawings and particularly to the Fig. 1, the numeral 20 designates the frame of the vehicle having both ends of the spring 21 attached thereto. The spring rests upon and is attached to the vehicle axle 22 to which the vehicle wheels, not shown, are secured.

The shock absorber comprises a casing 23, having apertured ears 24 for receiving bolts 25 by which the shock absorber is attached to the frame 20. A cap or cover 26, provided with a gasket 27, is secured to the casing 23 by screws 28, see Fig. 3, and form a fluid tight covering for said casing. Suitable lugs formed on the walls of the casing 23 provide for bearings 29 and 30 in which is journalled the rocker-shaft 31 one end of which extends outside the casing 23. The bearing portion 30 is rendered leak proof by the disc plug 32. Fluid is substantially prevented from leaking through bearing 29 by packing rings, 33, of any suitable material, pressed into close engagement with the projecting rocker-shaft 31 by a sleeve 34 which fits snugly about the lug portion providing bearing 29. To the end of the rocker shaft 31 extending outside the casing 23 is rigidly attached one end of the shock absorber operating arm 35 the other end of said arm having one end of the connecting rod 36 swivelly secured thereto. The other end of the rod 36 is swivelly attached to a clamp 37 which is adapted to be anchored to the vehicle axle 22.

The shock absorber casing 23 presents a fluid chamber 40 and two cylinders 41 and 42, the former being termed the "bumper" side of the shock absorber, the latter the "snubber" side. The rocker-shaft 31 extends through the fluid chamber 40. A lever 43 comprising a hub portion 44 having oppositely disposed arms 45 and 46 is attached to the rocker-shaft 31 within the fluid chamber, interlocking serrations 47 on both the lever 43 and shaft 31 and a set screw 48 preventing relative rotational movement between them. The arms 45 and 46 of lever 43 are provided with a camming surface 49 and 50 respectively, said surfaces being in proper alinement with the "bumper" and "snubber" cylinders 41 and 42 respectively.

In each cylinder 41 and 42 there is provided a reciprocative fluid displacement member or piston 51 and 52 respectively. Inasmuch as both pistons are alike, and for the sake of brevity, the "bumper" piston 51 will be described. The piston comprises a head 53 and a skirt portion 54. The head 53 has two diametrically opposite through passages 55 and 56 providing conduits for the transfer of fluid from one side of the piston to the other in response to the movement of the piston in one direction. The portion 57 of the piston head, between passages 55 and 56 has a passage substantially coaxial of the piston one portion 58 of said passage being of lesser transverse dimensions than the other portion 59. The knurled end of the valve-pin 60 is driven into the passage portion 58 and is thus rigidly supported in the piston substantially coaxial of the piston skirt 54. A wear piece 66 made up of comparatively hard, wear resisting material has a shank portion which fits into the passage portion 59 and a head portion which rests upon the upper or outer surface of the piston head.

Adjacent the end of each arm 45 and 46 of the lever 43 there is provided a cross pin 61 extending from each side of the lever the ends of each pin being provided with an enlarged head 62 spaced from the respective sides of lever 43. A U-shaped link, preferably constructed of wire has two, substantially parallel arm portions 63 and a connecting web portion, the latter portion having a loop 64 of substantially a single convolution which fits loosely about the valve-pin 60. The ends of the arm portion 63 are looped and fit about the respective ends of the cross-pin 61, said looped ends fitting into the spaces provided between the respective pin heads 62 and the side of lever 43. A resilient member in the form of a coil spring 65 surrounds the valve-pin 60 and is interposed between the inner surface of the piston head portion 57 and the looped web portion 64 of the link. The link, just described, operatively connects the rocker-lever 43 with the piston 51, the spring 65 yieldably maintaining the wear-piece 66 in engagement with the camming surface 49 of the lever arm 45. Thus when the lever 43 is operated clockwise as regards Fig. 2, the link will lift or draw the piston 51 out of the cylinder 41. When lever 43 is moving in a counter-clockwise direction as regards Fig. 2, the camming surface 49 will exert pressure upon the wear piece 66 and push the piston 51 into its cylinder 41. The first stroke of the piston is its "suction" stroke the second stroke mentioned, its compression.

Valve-pin 60 not only supports the link portion 64, but there is also slidably supported upon this pin the valve 70 which is yieldably maintained against its valve-seat 71 by a spring 72 interposed between said valve 70 and an abutment cup 73 secured to the valve stem 60 by a C washer 74. The valve-seat 71 is provided by an annular flange on the inner surface of the piston skirt portion 54 said annular flange having a peripheral ridge with a comparatively narrow face forming the seat upon which the valve 70 rests. In the outer surface of the piston and longitudinally thereof, there is provided a channel 75 which is in communication with the passages 55 and 56 through the piston head 53, by a transverse passage 76. A metering pin 77 extending longitudinally into the cylinder 41 fits into the piston passage 75, the one end of said metering pin 76 resting upon the closed end of the cylinder 41, the other end of said pin being engaged by the casing cover 26 which securely holds the pin in proper position so that the piston may readily slide over said pin as it is being operated in either direction in its cylinder. One surface of the metering pin, preferably the one facing the cylinder wall, has a recess 79 one end of which is gradually sloped as at 78. This sloped end of the recess 79 is positioned relative to the lower end of the piston 51 when said piston is in normal position in accordance with the type of car upon which the shock absorber is to be used and with the resisting effects desired.

As has been mentioned heretofore, the "snubber" piston 52 and its connections with the lever arm 46 are like piston 51 and its connections. The metering pin 80, however, differs from the metering pin 77 in that its recess 81 is differently shaped. In Fig. 2, it may be seen that the recess 81 of pin 80 is shorter than the recess 79 of pin 77 and that both ends of recess 81 are sloping so that the piston, in moving over the recess 81 will have, first a gradually increasing fluid leak, then a gradually decreasing one, thus gradually decreasing resistance and then increasing it.

Both cylinders 41 and 42 have a common pressure relief valve adapted to open communication between the fluid chamber 40 and either one of the cylinders in which an excessive pressure obtains. The shock absorber casing 23 has a cylindrical, transverse passage 90 closed at one end by a wall 91 and open at the other. Both cylinders 41 and 42 communicate with passage 90 and on opening 92 leads from said passage 90 to the fluid reservoir 40. A cylindrical plug 93 fits into the passage 90, said plug has an eccentric lug at its one end extending into an opening in wall 91 of passage 90 thereby preventing the plug 93 from rotating in passage 90. The other end of the plug 93 has a flat portion 94 and two oppositely disposed angular faces 95 and 96. On diametrically opposite sides of the plug 93 are arcuate recesses coinciding with the inner wall surface of the respective cylinders when the plug is in proper position in the passage 90. Longitudinal passages 97 and 98 in the plug communicate respectively with the arcuate recesses mentioned, said passages 97 and 98 both terminating in the flat end surface of the plug on diametrically opposite side of its center. A valve stem 99 is screw-threaded into an axial opening in the flat end surface of the plug. Adjacent this end surface of the plug, the valve-stem has an annular groove 100 provided thereon. A ring-shaped disc-valve 101 fits about the valve-stem and is yieldably maintained against the flat end surface 94 of the plug by a spring 102, normally to hold the passages 97 and 98 closed.

The spring 102 extends into a recessed nut 103 which is screw-threaded into the open end of passage 90. A groove 104 extends longitudinally of the plug 93, one end terminating in the angular face 95, said groove being in communication with the opening 92 leading to the fluid chamber 40.

The device operates as follows:

When the road wheels (not shown) of the vehicle strike an obstruction in the roadway, the axle 22 will be moved toward the frame 20 flexing the spring 21 in this direction. Movement of the axle 22 toward the frame causes the connecting rod 36 to move the shock absorber operating arm 35 so that it, in turn, will rotate the rocker shaft 31 in a counterclockwise direction as regards Figs. 1 and 2. This movement of the rocker shaft 31 will cause the camming face 49 of the lever arm 45 to exert a pressure upon the wear piece 66 and thus move the piston 51 toward the bottom of its cylinder 41. The aforementioned counterclockwise rotation of shaft 31 will also cause the lever arm 35 through its link connection with piston 52 to move said piston in its cylinder away from the bottom thereof.

As the piston 51 moves farther into its cylinder, a pressure will be exerted upon the fluid within the cylinder 41, said pressure assisting spring 72 in maintaining the valve 70 in engagement with its valve seat member 71 so that no fluid from the cylinder 41 may escape through the passage controlled by the valve 70. In moving downwardly from its normal position as shown in Fig. 2, the piston 51 approaches the sloping end 78 of the recess 79 provided by the metering pin 77. The first leak of fluid from the cylinder 41 through the recess 79 of the metering pin and thence through transverse passage 76 and communicating passages 55 and 56 is restricted to a certain degree; however, continued movement of its piston downwardly approaching the sloping surface 78 of the recess 79 will gradually reduce the area of the orifice provided between the lower end of the piston and the metering pin recess, thus the fluid flow through this orifice, or which might be termed the fluid leak from the cylinder 41 past the piston via the metering pin will be gradually restricted and consequently a gradual resistance to the movement of the piston is afforded. Thus the flexing movement of the spring 21 toward the frame 20, due to the vehicle wheels striking an obstruction in the roadway, is gradually, increasingly restricted by the bumper piston 51.

During the aforedescribed movement of piston 51, piston 52 is moved in the opposite direction or, out of its cylinder 42, so that the fluid within the fluid chamber 40 passing through the piston head passages corresponding to passages 55 and 56 of piston 51, will exert sufficient pressure upon the piston valve 270 to move it away from its valve seat 271, and thus a free flow of fluid from the fluid chamber into cylinder 42 is established in response to the movement of the piston away from the end of its cylinder.

As soon as spring 21 has reached its limit of flexure, caused by the striking of the obstruction, it will have a tendency to rebound suddenly. However, in its reverse movement the spring 21 exerts a pull on connecting link 36 which moves lever 35 to operate the rocker shaft 31 in a clockwise direction. Under these conditions arm 45 through its link connection with the piston 51 moves said piston upwardly and outwardly in its cylinder 41, the fluid within the fluid chamber exerting pressure upon the valve 70 to move said valve away from its valve seat 71 and thus establish a free flow of fluid through the piston into cylinder 41. When the spring 21 is flexed, that is, after having moved the rocker shaft 31 in a counterclockwise direction, piston 52 will have reached a point in the cylinder 42 in which the bottom portion of the piston is located somewhere above the center of the recess 81 in the metering pin 80. Reverse movement of piston 52, or movement toward the bottom of its cylinder, exerts pressure upon the fluid within the cylinder 42, causing valve 270 to close tightly, the fluid then escaping through the orifice provided between the piston and the recess of metering pin 80. The contour of the recess 81 of said metering pin is such that the orifice is comparatively small when the piston is at the top, but as said piston moves over the pin toward the bottom of the cylinder, said orifice will become gradually larger, up until a certain point, after which the orifice is gradually decreased. The results of the above are that the restriction to the flow of fluid through aperture 81 of the metering pin 80 to the transverse passage 276 of piston 52 will be at first comparatively high, said restriction being gradually reduced and then gradually increased. Thus the return movement of the spring 21 will be gradually, decreasingly resisted to a certain point, and then said resistance will be gradually increased. From the aforegoing it may be seen that the movement of the spring toward the frame is gradually and increasingly resisted, while its return movement is variably resisted,—that is for the first portion of its return movement it is gradually decreasingly resisted, and for the second portion gradually increasingly resisted.

When large obstructions in the roadway are met by the vehicle wheels, connecting linkage with piston 51 will have a tendency to move said piston further down into its cylinder and at a faster rate, thus the pressure upon the fluid within cylinder 41 will be excessive, the orifice provided between the piston and the metering pin 77 being insufficient to provide an escape for the fluid. In order to provide for such excessive pressures, applicant has included in his device a safety relief valve comprising the plug 93, provided with suitable fluid passages and having a spring pressed valve 101. The excessive fluid pressure in cylinder 41 will be exerted through passage 97 upon valve 101, thereby tending to tilt said valve upon the valve stem 99 against the effect of spring 102, thus opening communication between passage 97 and passage 104, thereby permitting fluid to escape from the cylinder 41 through passage 97, past valve 101, through 104, opening 92 into the fluid chamber 40 and thereby relieving the excessive pressure within the said cylinder 41. Some fluid from cylinder 41 may find its way from passage 97 past the valve 101 into the passage 98 which communicates with cylinder 42. However, the greater portion of the fluid will flow through the aforementioned passages into the fluid chamber 40. When the rebound of spring 21 causes excessive pressures within the cylinder 22, the valve 101 is tilted to provide communication between passages 98 and 104, thus permitting fluid from cylinder 42 to leak or escape through said passages and opening 92 into the fluid chamber 40.

The tilting of valve 101 is made possible by providing the valve stem 99 with an arcuate, annular groove 100 adjacent said valve 101, the object of tilting said valve being to eliminate noisy operation which would obtain if the valve were moved on the valve stem 99 substantially parallel with its axis.

Provision of the resilient member or spring 65 between the link connecting the pistons with their respective lever arms 45 and 46 provide means which are yieldable if in any case said piston would have a tendency to stick while traveling in the one direction.

Applicant has provided a shock absorber of simple structure and design, the moving parts of which are substantially positive in their operation, said parts being so constructed that they may readily be assembled at a minimum expenditure of time and labor. This device controls the action of the vehicle springs so that road shocks are dissipated before being transmitted to the frame of the vehicle, said device permitting free action of the vehicle springs when slight obstructions are met by the wheels of the vehicle.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a casing presenting a fluid chamber and a cylinder; a piston in said cylinder, having a longitudinal groove in its outer wall; means for operating said piston; means for establishing a free flow of fluid from one side of the piston to the other in response to movement of the piston in one direction, means for establishing a restricted flow of fluid from one side of the piston to the other in response to the movement of the piston in the other direction, said last mentioned means comprising a metering pin having a varying cut-away portion and fitting into the longitudinal groove of the piston, the one end of the metering pin resting upon the closed end of the cylinder; and a cover cap attachable to the casing for sealing the fluid chamber, said cover cap engaging the other end of the metering pin whereby said metering pin is securely held in proper position.

2. A shock absorber comprising in combination, a casing presenting a fluid chamber and two cylinders, a piston in each cylinder, means for operating said pistons; a common relief valve for both cylinders adapted to provide for a flow of fluid from either one of the cylinders to the fluid chamber in response to the movement of the respective pistons in one direction, said relief valve comprising a valve-seat member having a separate fluid passage leading to each cylinder, a fluid passage leading to the fluid chamber, and a valve yieldably maintained against the valve-seat member normally to close the separate fluid passages leading to the two cylinders, said valve being tiltable by fluid pressure in either cylinder to provide communication between either of said cylinders and the fluid passage leading to the fluid chamber.

3. A shock absorber comprising in combination; a casing presenting a fluid chamber and two cylinders; a piston in each cylinder; means for operating said pistons; means for establishing a free flow of fluid from the fluid chamber, through the pistons and into the cylinders in response to the movement of the respective pistons in one direction, and a common relief valve for establishing a restricted return flow of fluid from either one of the cylinders to the fluid chamber in response to the movement of the respective pistons in the other direction, said relief valve comprising a valve core one end of which provides a valve-seat, said core having two distinct fluid passages terminating in the valve seat each passage leading into a respective cylinder, a third fluid passage in the core opening into the fluid chamber and distinct from the aforementioned two passages, a valve-stem attached to the valve-core, said valve-stem having an annular groove adjacent the valve-seat, a valve fitting loosely upon the stem, and a spring about the valve stem yieldably maintaining the valve against the valve-seat portion of the core normally to close the fluid passages in the core leading from each cylinder, the annular groove in the valve-stem permitting the valve to tilt upon the stem in response to fluid pressure in either of the cylinders whereby one cylinder is brought into communication with the said third fluid passage of the core.

4. A shock absorber comprising in combination, a casing presenting a fluid chamber and a pair of cylinders, a piston in each cylinder, means for operating said piston, means for establishing a free flow of fluid from the fluid chamber into the respective cylinders in response to the movement of the respective pistons in one direction, and spring-loaded means adapted to provide direct communication between the two cylinders when either one of the pistons moving in said one direction exerts an excessive pressure upon the fluid in its cylinder.

5. A shock absorber comprising in combination, a casing presenting a fluid chamber and a pair of cylinders, a piston in each cylinder, means for operating said pistons, means for establishing a free flow of fluid from the fluid chamber into the respective cylinders in response to the movement of the respective pistons in one direction, spring-loaded and a common relief valve adapted, in response to a proper increase in fluid pressure, to provide direct communication between the two cylinders and between the compression cylinder and the fluid chamber.

6. A shock absorber comprising in combination, a casing presenting a fluid chamber and a pair of cylinders, a piston in each cylinder, means for operating said pistons, means for establishing a free flow of fluid from the fluid chamber into each cylinder in response to the movement of the respective pistons in one direction, means for establishing a restricted flow of fluid from each cylinder to the fluid chamber in response to the movement of the respective pistons in the other direction, and means providing communication between the two cylinders when either one of the pistons moving in the said other direction exerts a predetermined high pressure upon the fluid in its respective cylinder.

7. A shock absorber comprising in combination, a casing presenting a fluid chamber and a pair of cylinders, a piston in each cylinder, means for operating said pistons, means for establishing a free flow of fluid from the fluid chamber into each cylinder in response to the movement of the respective pistons in one direction, means for establishing a restricted flow of fluid from each cylinder to the fluid chamber in response to the movement of the respective pistons in the other direction, and a common relief valve for both cylinders.

8. A shock absorber comprising in combination, a casing presenting a fluid chamber and a pair of cylinders, a piston in each cylinder, means for operating said pistons, a valve in each piston for establishing a free flow of fluid from the fluid chamber into the respective cylinders in response to the movement of the respective pistons in the one direction, means for establishing a restricted flow of fluid from each cylinder to the fluid chamber in response to the movement of the respective pistons in the other direction, said means comprising a member carried by each piston and a cooperating member supported by the casing in each cylinder, means controlled by fluid pressure to provide communication between the cylinders when said fluid pressure in either cylinder exceeds a certain value.

9. A shock absorber comprising in combination, a casing presenting a fluid chamber and a pair of cylinders, a piston in each cylinder, means for operating said pistons, a valve in each piston for establishing a free flow of fluid from the fluid chamber into the respective cylinders in response to the movement of the respective pistons in the one direction, means for establishing a restricted flow of fluid from each cylinder to the fluid chamber in response to the movement of the respective pistons in the other direction, said means comprising a recess provided in each piston, adapted to receive a cooperating member supported by the casing in each cylinder, and a common relief valve for both cylinders.

10. A shock absorber comprising in combination, a casing presenting a fluid chamber and a pair of cylinders, a piston in each cylinder, means for operating said pistons, means in each piston for establishing a free flow of fluid from the fluid chamber into the respective cylinders in response to the upward movement of said pistons, means in the one cylinder for establishing a gradually increasing restricted flow of fluid from said cylinder to the fluid chamber in response to the downward movement of its piston, means in the other cylinder for establishing a gradually decreasing restricted flow of fluid from said cylinder to the fluid chamber in response to the downward movement of its piston, and a common means for connecting the two cylinders when the pressure on the fluid in one cylinder is excessive.

11. A shock absorber comprising in combination, a casing presenting a fluid chamber and a pair of cylinders, a piston in each cylinder, means for operating said pistons, means in each piston for establishing a free flow of fluid from the fluid chamber into the respective cylinders in response to the upward movement of said pistons, means in the one cylinder for establishing a gradually increasing restricted flow of fluid from said cylinder to the fluid chamber in response to the downward movement of its piston, means in the other cylinder for establishing a gradually decreasing restricted flow of fluid from said cylinder to the fluid chamber in response to the downward movement of its piston, and a common relief valve for both cylinders adapted to relieve fluid pressures in either cylinder when the means for establishing the restricted flow of fluid from the respective cylinders is unable to relieve pressure conditions.

12. A shock absorber comprising in combination, a casing presenting a fluid chamber having two cylindrical portions, a piston in each cylindrical portion, each piston having two passages providing communication between the cylinder portions beneath the pistons and the fluid chamber above the pistons, means for closing one of said passages in each piston when the respective piston is moved in one direction, means adapted gradually to restrict the flow of fluid through the second passage in the one piston when said piston is moved in the other direction, means adapted initially to present a maximum restriction to the flow of fluid through the second passage of the other piston when said piston is moved in the other direction, said means, however, gradually varying said restriction to the fluid flow as the piston continues to move in said other direction, and means adapted to provide communication between the cylinders when the pressure upon the fluid in one cylinder is excessive.

13. A shock absorber comprising in combination, a casing presenting a fluid chamber having two cylindrical portions, a piston in each of said portions, means for operating said pistons, means in each piston for establishing a free flow of fluid from the fluid chamber into the respective cylindrical portions in response to the movement of the respective pistons in one direction, means for establishing a restricted flow of fluid from each cylindrical portion to the fluid chamber in response to the movement of the respective pistons in the other direction, and means providing communication between the two cylinders when the fluid pressure in either one of the cylinders becomes excessive.

14. A shock absorber comprising in combination, a casing presenting a fluid chamber and two cylinders, a piston in each cylinder, means for operating said pistons, a valve in each piston for establishing a free flow of fluid from the fluid chamber into the cylinders in response to the movement of the respective pistons in one direction, means adapted variably to restrict the flow of fluid from the cylinders to the fluid chamber in accordance with the movement of the respective pistons in the other direction, and a spring-leaded relief valve interposed between the cylinders and adapted to provide communication between said cylinders in response to excessive pressure on the fluid in either cylinder.

15. A shock absorber comprising in combination, a casing presenting a fluid chamber and a pair of cylinders, a piston in each cylinder, means for operating said pistons, means for establishing a free flow of fluid from the fluid chamber into each cylinder in response to the movement of the respective pistons in one direction, means for establishing a restricted flow of fluid from each cylinder to the fluid chamber in response to the movement of the respective pistons in the other direction, and a relief valve normally shutting off communication between the cylinders, but operable by excessive pressure in either cylinder to establish communication between said cylinders, said relief valve comprising, a stationary core having a passage communicating with each cylinder respectively and a spring pressed valve member normally closing the end of said passages but operable by fluid pressure in said passages a communicating channel between said passages.

In testimony whereof I hereto affix my signature.

WILLIAM A. CHRYST.